Dec. 5, 1933.    G. STEELE    1,938,158
BATTERY CARRIER
Filed Dec. 3, 1932
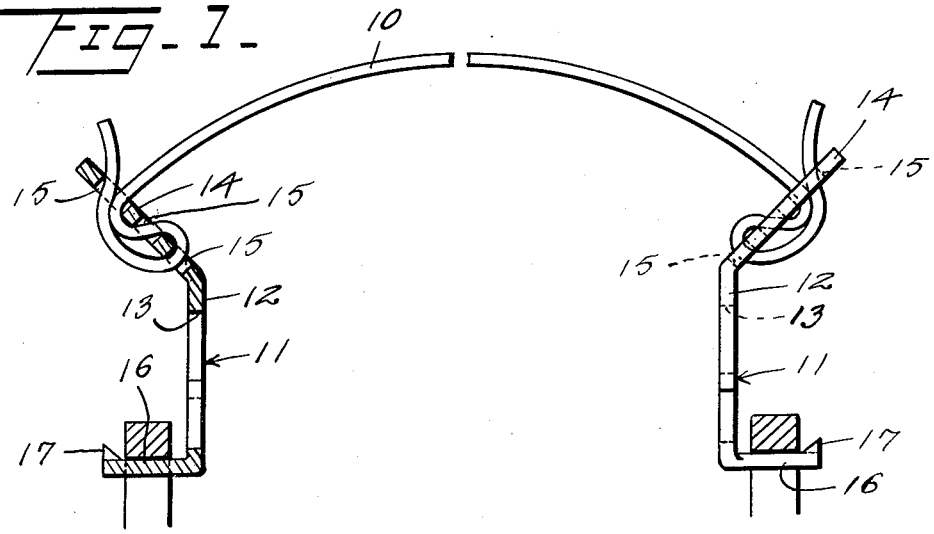
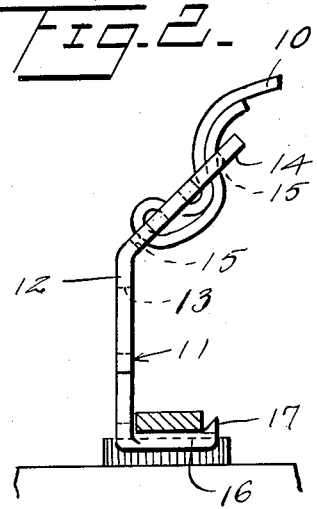
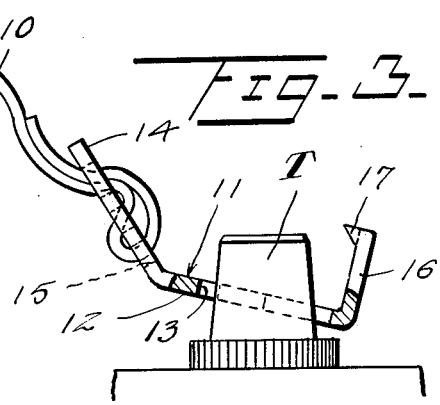
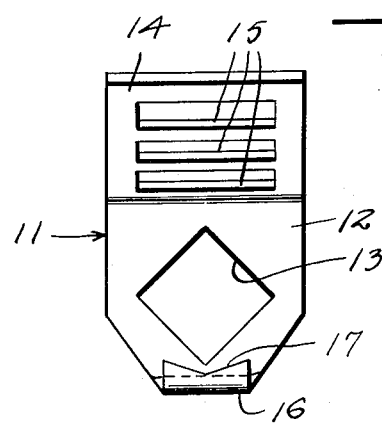
Inventor
George Steele
By Watson E. Coleman
Attorney Patented Dec. 5, 1933

1,938,158

UNITED STATES PATENT OFFICE 1,938,158

BATTERY CARRIER

George Steele, Norristown, Pa.

Application December 3, 1932. Serial No. 645,631

5 Claims. (Cl. 294—92)

This invention relates to carrying devices, and more particularly to a detachable handle for use in connection with the carrying of heavy articles such as batteries or the like.

An object of this invention is to provide a carrying handle or means which is so constructed that it can be used with any of the various types of batteries at present in use.

Another object of this invention is to provide a carrying means which is exceedingly simple in construction and can, therefore, be manufactured at an exceedingly small cost.

The above and various other objects and advantages of this invention will in part be described and in part be understood from the following detailed description of the present preferred embodiment, the same being illustrated in the accompanying drawing, wherein:—

Figure 1 is a detail side elevation of a carrier constructed according to the preferred embodiment of this invention with the battery engaging jaws turned outwardly.

Figure 2 is a fragmentary side elevation partly in section, showing the carrier jaw turned inwardly.

Figure 3 is a fragmentary side elevation partly in section of one of the carrier jaws in horizontal position for engagement with a battery terminal post.

Figure 4 is a detail front elevation of one of the carrier jaws removed from the handle.

Referring to the drawing wherein like numerals of reference designate corresponding parts throughout the several views, the numeral 10 designates generally an elongated strap or flexible member which has attached to each end thereof a battery engaging means. This battery engaging means comprises a flat bar, generally designated as 11, which has the body portion 12 thereof provided with an angular opening 13.

The body 12 has an apertured extension 14 formed therewith, which is disposed on an obtuse angle to the length of the body 12, and this extension 14 is provided with a plurality of elongated slots or rectangular-shaped openings 15 for the reception of an end portion of the strap or flexible handle 10. The end of the strap 10 is adapted to be threaded through the openings 15, as shown in Figure 1. The lower end of the body 12 terminates in a right angularly related extension or lug 16, and this extension is provided with a lip 17 acting as a retaining means to prevent the lug 16 from slipping off a portion of the battery engaged by this lip or battery engaging member 16. In practice, there are two of these battery carrying members 11, one disposed at each end of the flexible strap 10.

This carrier may be used, as shown in Figure 1, with the battery engaging members 16 in substantially a horizontal position and extending outwardly of the handle 10. In this position, the lugs 16 may engage in the hand holes provided in the upstanding portions of a battery or may be engaged beneath the connecting terminals of the cells of the battery.

As shown in Figure 2, the plate members 11 may be reversed so that the extensions 16 will extend inwardly one toward the other and in this position, the extensions 16 may engage the connecting terminals for the cells of the battery from the outside or may engage the opposite ends of the battery in hand holes provided either above the body of the battery or in the side wall of the battery below the top.

In cases, however, where it is not possible to slip the lugs 16 into hand holes or the like, the body members 12 may be positioned in a horizontal position, as shown in Figure 3, with the battery terminal T positioned in the angular opening 13 of the body 12. The upward movement of the flexible handle member 10 will tilt the body member 12 so as to cause the edges of the opening 13 to cut into the side of the terminal T and thereby hold the jaw member 11 against movement relative to the terminal T.

It will, therefore, be seen that the carrier herein disclosed can be used in a number of different ways to support a battery so that it may be lifted out of the hanger in a vehicle or may be readily replaced in the hanger.

In view of the type of handle 10 provided, the carrier can be readily folded so as to occupy only a relatively small amount of space. This flexible member 10 may be in the form of a strap of leather, composition, cloth or the like.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A carrier comprising a flexible member, a pair of flat members secured one to each end of the flexible member, an angularly related battery engaging member integral with each flat member, and a lug integral with the battery engaging member and extending in a direction parallel with the body of the flat member.

2. A carrier comprising an elongated flat flexible member and a pair of battery engaging members secured one to each end of the flexible member, said battery engaging members comprising a flat body having an angular opening therethrough, an apertured extension integral with one end of the body and extending at an obtuse angle relative thereto, said flexible member being threaded through the apertures of said apertured extension, a second extension integral with the opposite end of the body and extending at substantially a right angle therefrom, and a lip formed with the outer end of said second extension.

3. A carrier comprising a handle and a pair of battery engaging members secured one to each end of the handle, each of said members comprising a bar having an extension disposed at substantially a right angle to the bar, a lug on said extension and extending in the direction of the opposite end of the bar, said bar having a rectangular terminal receiving opening therethrough intermediate said extension and the opposite end of the member the marginal portions of opposed pairs of sides of said opening engaging the surface of a terminal post.

4. A carrier comprising a handle and a pair of battery engaging members secured one to each end of the handle, each of said members comprising a bar having an extension disposed at substantially a right angle to the bar and a lug on said extension and extending in the direction of the opposite end of the bar, said extension being adapted to engage beneath a cell connecting link of a battery and said lug engaging on one side of said link to hold said battery engaging member against lateral movement on said link.

5. A carrier comprising a handle, and a pair of battery engaging members secured one to each end of the handle, each of said members comprising a flat bar having an extension at one end terminating in a lug offset from the body of the bar and extending in the direction of the opposite end of the bar.

GEORGE STEELE.